United States Patent [19]

Ohara

[11] 4,375,064
[45] Feb. 22, 1983

[54] LASER RECORDER

[75] Inventor: Yuji Ohara, Asaka, Japan

[73] Assignee: Fuji Photo Film Co., Ltd., Kanagawa, Japan

[21] Appl. No.: 256,467

[22] Filed: Apr. 22, 1981

[30] Foreign Application Priority Data

Apr. 24, 1980 [JP] Japan .................................... 54/607

[51] Int. Cl.³ ........................................... G01D 15/14
[52] U.S. Cl. .................................... 346/108; 358/298
[58] Field of Search ........................... 346/76 L, 108; 358/296–300, 302, 283; 369/129

[56] References Cited

U.S. PATENT DOCUMENTS 3,725,574 4/1973 Gast .................................... 358/298
4,001,492 1/1977 Suzuki et al. .................... 358/298 X

FOREIGN PATENT DOCUMENTS 55-102966 8/1980 Japan .................................. 358/298

OTHER PUBLICATIONS

IBM Technical Disclosure Bulletin, vol. 18, No. 3, "Adaptive Contrast Ranging for Images", Wong, Aug. 1975, pp. 914–917.

Primary Examiner—G. Z. Rubinson
Assistant Examiner—W. J. Brady
Attorney, Agent, or Firm—Sughrue, Mion, Zinn, Macpeak and Seas

[57] ABSTRACT

A laser recorder using a semiconductor laser which is capable of reproducing an image such as a picture having half-tones with a high quality. An input signal is sampled with pulses from a timing processing circuit and converted using a read-only memory into pulse numbers and a corresponding positive-negative pulse identifying bit. The output of the read-only memory is compared with the output of a counter to thereby apply pulses to a laser oscillator in a number and with a polarity specified by the output number from the read-only memory.

5 Claims, 16 Drawing Figures

HIGH FREQ. PULSE, 21

TIMING PULSE, 16

COINCIDENCE SIGNAL, 25

GATE SIGNAL, 26

POSITIVE PULSE NUMBER MODU. SIGNAL, 28

NEGATIVE PULSE NUMBER MODU. SIGNAL, 31

LASER RECORDER

BACKGROUND OF THE INVENTION

The present invention relates to a laser recorder using a semiconductor laser which is capable of reproducing an image such as a picture having half-tones with a high quality.

In intensity-modulating a laser beam for recording an image having half-tones (hereinafter referred to as "a half-tone image" when applicable), any of (1) a technique of using an ultrasonic optical modulator, (2) a technique of varying the discharge current of a gas laser, and (3) a technique of varying the current of a semiconductor laser may be employed.

The first technique is disadvantageous in that it is expensive and requires an intricate construction because of the need for an expensive ultrasonic optical modulator and a fine adjustment mechanism for matching Bragg angles in the modulator.

The second technique is also disadvantageous in that the modulating frequency is in a low frequency band of the order of several hundreds of Hertz and the service life of the laser tube is reduced by varying the discharge current.

The third technique wherein the current of a semiconductor laser is varied suffers from the drawback that, since the optical output vs. current characteristic curve of the semiconductor laser is as shown in FIG. 1, the optical output is greatly varied merely by slightly changing the input current. Therefore it is considerably difficult to record a half-tone image by controlling the optical output in an analog mode by varying the input current.

Accordingly, an object of the invention is to provide a laser recorder which can produce a half-tone image with a high accuracy.

In the laser recorder of the invention, the high frequency modulation characteristic of a semiconductor laser is utilized to provide several tens to several hundreds of modulation levels utilizing binary modulation.

A method wherein an input signal is sampled with a sampling pulse, and a high frequency pulse signal having a frequency of at least 10 Hz is produced using the sampling pulse so that the number of high frequency pulses outputted in each sampling period is controlled according to the input signal with the pulses applied to a semiconductor laser thereby to record a half-tone image has been disclosed in United States patent application No. 214,815 filed Dec. 9, 1980 (corresponding to Japanese Patent application No. 168565/1979) filed by the present applicant. The method therein described is referred to as "a pulse number modulation method" hereinafter.

The term "sampling pulse" as used herein is intended to mean a pulse for sampling an input video signal at predetermined time intervals. The frequency of the sampling pulse can be selected as desired. However, it is preferable that it be slightly higher than the maximum frequency of the video signal in order to reproduce the image with a high resolution. Furthermore, the term "high frequency pulse" is intended to mean a pulse whose frequency is higher than that of the sampling pulse mentioned above. Preferably, the frequency of the high frequency pulse signal is several hundred to several thousand times that of the sampling pulse signal. These two pulse signals may be generated separately although it is preferable that the sampling pulse signal be obtained by subjecting the high frequency pulse signal to frequency division.

The amount of exposure of each of the picture elements which form an image is determined by the number of high-frequency pulses which are applied to a semiconductor laser with the number of pulses being determined according to the level of an input video signal during the respective sampling period. That is, the total optical energy applied to a picture element, i.e., the exposure E, is defined by the following expression:

$$E = N \cdot \Delta e \qquad (1)$$

where $\Delta e$ is the optical energy which is applied to a photo-sensitive material by the semiconductor laser in response to one high frequency pulse and N is the number of high-frequency pulses (pulse number) which are provided according to the level of an input video signal for the picture element.

The high-frequency pulse number N not only corresponds linearly to the input signal but also includes a logarithmic conversion relation, a recording material characteristic, or an input/output characteristic stored. The input signal is a video signal which may be an analog signal or a digital signal.

The relation between pulse numbers and densities of an image to be recorded in the case where the image is recorded by a semiconductor laser which is controlled by the number of high-frequency pulses will be described with reference to FIG. 2.

In FIG. 2, a curve I is an example of the characteristic curve of a recording material, indicating the logarithm of the exposure amount E with density, and a curve II is an example of the relation between the numbers of high-frequency pulses and the logarithms of exposure amounts E of the recording material which are determined from the numbers.

In FIG. 2, once a density level has been selected, the corresponding high-frequency pulse number N can be obtained by following the arrow. When the density level D is changed from 0.1 to 0.2 in the low density range, the high-frequency pulse number N increases by only about nine. On the other hand, when the density level D is changed from 1.3 to 1.4 in the high density range, the high-frequency pulse number increases by about fifty pulses.

As is apparent from the above description, in order to reproduce the gradations of an image with a sufficiently high accuracy at equal density intervals, the frequency of the high frequency pulse must be much higher than that of the sampling pulse, for instance, several hundred times or, if necessary, several thousand times higher.

The relation of the sampling pulse frequency $f_s$, the high-frequency pulse frequency $f_H$, and the maximum level of the input signal, i.e., the maximum pulse number $N_{max}$ which is required for the level of the input signal to which the maximum exposure corresponds is:

$$f_H \geq N_{max} \times f_s \qquad (2)$$

The maximum pulse number $N_{max}$ will be larger than the values specified in FIG. 2 if the density intervals are sufficiently small to reproduce the image with a high accuracy or for certain ranges of the characteristic of the photosensitive material such as $\gamma$ (the maximum gradient of the characteristic curve) and a range of density D. As a result, the high-frequency pulse frequency is greatly increased making it difficult to provide circuitry implementing the above-described modulation method.

By way of example, if the sampling frequency $f_s = 100$ KHz, and the maximum pulse number $N_{max} = 500$, the corresponding necessary high-frequency pulse frequency $f_H$ is:

$$f_H \geq N_{max} \times f_s = 50 \text{ MHz}.$$

Accordingly, a circuit for practicing the above-described modulation method cannot be constructed with standard TTL (transistor-transistor-logic) elements. Thus, the conventional modulation method is disadvantageous in that ECL (emitter-coupled logic) elements or the like must be used to implement the required circuit and hence the circuit has a considerably high manufacturing cost.

Furthermore, another disadvantage is that, even if the maximum number $N_{max}$ of high-frequency pulses is outputted during the sampling period of picture element, no light is outputted between the pulses as indicated by shaded portions in FIG. 3B as a result of which the efficiency of utilization of light is low with respect to the quantity of light produced by the light source making it necessary to increase the quantity of output light provided by the light source.

Moreover, if an optical output is provided with a pulse width corresponding to a high-frequency pulse number N as shown in FIG. 3C (hereinafter referred to as "pulse width modulation" when applicable), the efficiency of utilization of light is about doubled and the exposure Δe (cf. FIG. 3C) is also about double that for pulse number modulation, as a result of which the exposure level resolution of each picture element, i.e., the reproduction density resolution, is necessarily decreased.

In view of the foregoing, an object of the invention is to decrease the high-frequency pulse frequency $f_H$ to half of that used in the conventional method without decreasing the reproduction density resolution thereby to decrease the circuit cost and to substantially double the efficiency of utilization of the light of the light source.

SUMMARY OF THE INVENTION

Provided according to the invention is a laser recorder in which an input signal is sampled with a sampling pulse and the number of pulses outputted during a sampling period is controlled according to the level of the input signal to provide a signal with which a light beam is subjected to binary modulation to record an image having half-tones. According to the invention, a positive pulse number is utilized for a low exposure level while a negative pulse number is utilized for a high exposure level.

The terms "positive pulse" and "negative pulse" as used herein are defined in FIG. 4A and 4B, respectively. That is, when each of the pulses is at a high logic level "H", the light beam intensity is high (ON), and when it is at a low logic level "L", the intensity is low (OFF).

DESCRIPTION OF THE PREFERRED EMBODIMENTS

A preferred embodiment of a laser recorder according to the invention will be described with reference to FIGS. 5 and 6.

Figure 5:
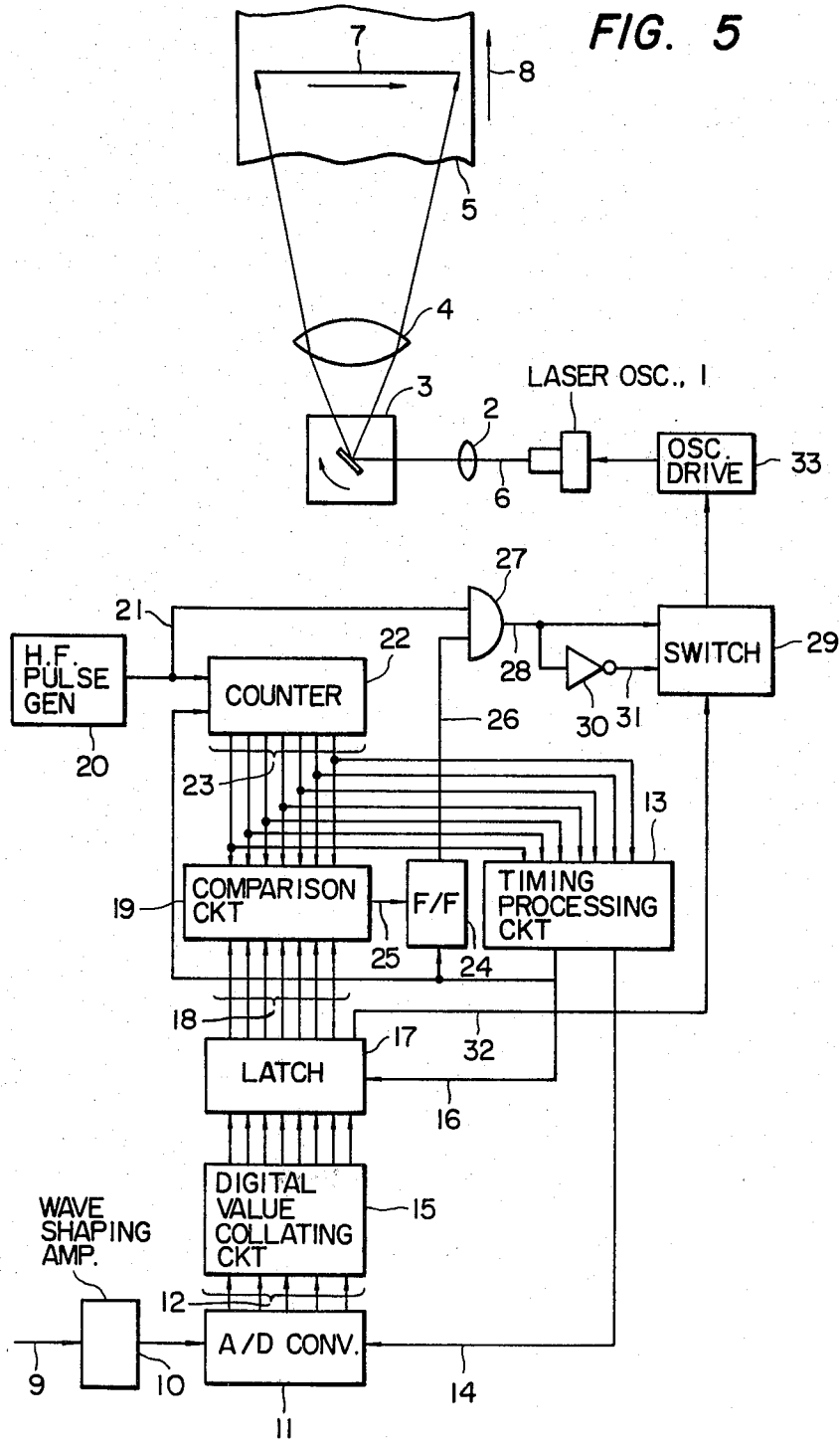
FIG. 5 is a block diagram showing a preferred embodiment of a laser recorder according to the invention.
Figure 6A:
FIGS. 6A-6F taken together, are a timing chart for a description of the operation of the laser recorder of FIG. 5.
Figure 6B:
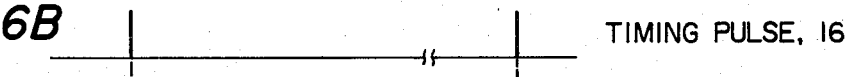
Figure 6C:
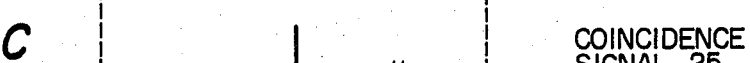
Figure 6D:
Figure 6E:
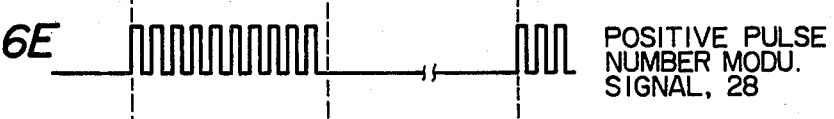
Figure 6F:
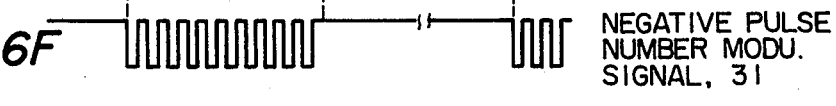

FIG. 5 is a block diagram showing the laser recorder according to the invention. In FIG. 5, reference numeral 1 designates a semiconductor laser oscillator, 2 a laser beam shaping lens, 3 a deflector, 4 a focusing lens, and 5 a recording sheet. It is desirable that the recording sheet 5 be a silver salt or electronic type which is capable of producing half-tones and is sensitive to the wavelength (red or infrared) of the semiconductor laser beam. A semiconductor laser beam 6, once current-pulse modulated is collimated by the beam shaping lens 2, is deflected by the deflector 3 and formed into a light spot having a predetermined size by the focusing lens 4. The laser beam 6 thus processed is used to perform the main scanning to trace scanning line 7 on the recording sheet 5. Auxiliary scanning is achieved by moving the recording sheet 5 in the direction of the arrow 8. In the described embodiment, the deflector 3 is a galvanometer.

A technique of modulating the semiconductor laser, which is one of the features of the invention, will be described. A semiconductor laser can be modulated with a pulse signal of a high frequency of up to several hundreds of megahertz. Utilizing high-frequency pulse modulation, the quantity of light can be controlled according to the number of pulses applied to the laser whereby half-tone recording can be achieved with a high precision.

An example of such pulse modulation will be described with reference to FIG. 5. An inputted video signal 9 is amplified to a predetermined level by a waveform shaping amplifier 10. The video signal 9 is, for instance, a received facsimile signal which represents the density of an original picture.

The input signal thus waveform-shaped is applied to an A/D (analog-to-digital) converter 11 where it is quantized into a 5-bit digital signal 12. The A/D converter 11 operates to perform a conversion operation upon receipt thereat of a sampling pulse 14 supplied by a timing processing circuit 13. The digital signal is held until the next sampling pulse is applied. The digital signal 12 is applied to a digital value collating circuit 15. The digital value collating circuit 15 operates to output a digital value representing the number N of high-frequency pulses which is required for the level of the input signal, i.e., the density level D of the original picture, as described with reference to FIG. 2. The circuit 15 may be implemented with a PROM (programmable read-only memory) for instance. The bits of the quantized input signal 12 are applied, as an address signal, to the circuit 15 in response to which the circuit 15 outputs, as output data, the number N of high-frequency pulses which has been stored at the corresponding address in the PROM.

In the preferred embodiment, the signal from a facsimile transmitter corresponds to the logarithm of the density of an original picture. However, if the signal is not in logarithmic form, the logarithm transformation function may be performed by the digital value collating circuit.

In this embodiment, the bits of the quantized input signal 12 are applied respectively to the 5-bit address input terminals of the digital value collating circuit 15. The data output of the digital value collating circuit 15 has 8-bits. Of the 8-bit data, the data from the first bit to the seventh bit represents the pulse number N which is provided according to the level of the input signal 12, and the remaining eighth bit data determines whether the pulse signal applied to the semiconductor laser beam oscillator 1 should be outputted by controlling the number of positive pulses or by controlling the number of negative pulses. This data is latched by a latch circuit 17 in accordance with a timing pulse 16 provided by the timing processing circuit 13.

Of the data latched in the latch circuit 17, the data 18 which represents the pulse number N is applied to one input port of a comparison circuit 19. A counter circuit 22 operates to count the number of high-frequency pulses generated by a high-frequency pulse generator 20. The output count value 23 of the counter circuit 22 is applied to the other input port of the comparison circuit 19. The count value 23 of the counter circuit 22 is further applied to the timing processing circuit 13 in response to which the circuit 13 outputs the aforementioned sampling pulse 14 and timing pulse 16 according to the count value 23 thus applied.

Figure 7:
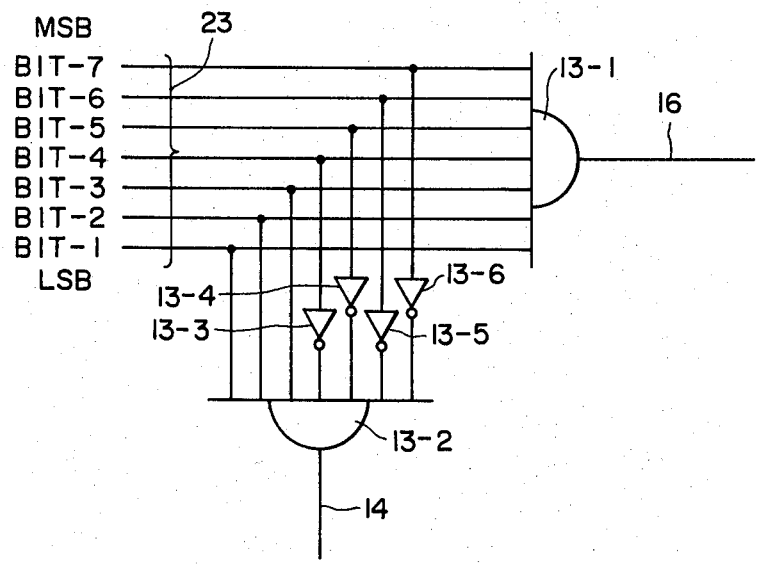
FIG. 7 is a logic schematic diagram of a timing processing circuit used in the laser recorder of FIG. 5.

The timing processing circuit 13 as indicated in FIG. 5 will be described in greater detail with reference to FIGS. 7 and 8. As shown in FIG. 7 the circuit includes AND gates 13-1 and 13-2 and inverters 13-3, 13-4, 13-5 and 13-6.

Figure 8:
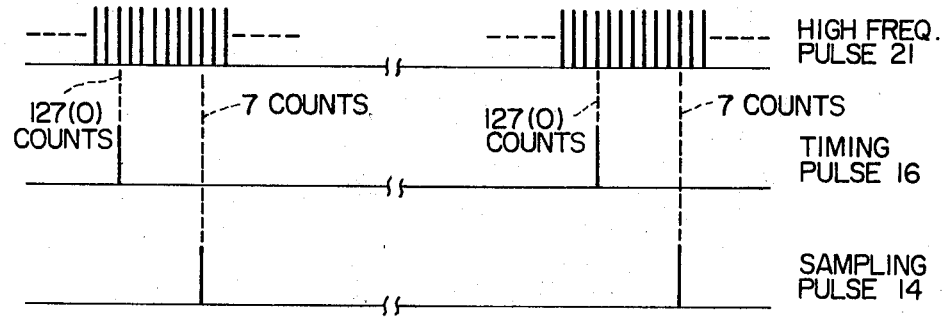
FIG. 8 is a timing diagram used for explaining the operation of the circuit of FIG. 7.

FIG. 8 is a timing chart for a description of the timing processing circuit shown in FIG. 7. The count value 23 outputted from the counter circuit 22 is applied to the AND gate 13-1 and a timing pulse 16 is generated therefrom when the count value 23 reaches 127. In response to the timing pulse 16 thus produced, new data is latched by the latch circuit 17, and simultaneously the counter circuit 22 is cleared and the flip-flop 24 is set.

On the other hand, the signals bit-1 (LSB), bit-2 and bit-3 from the counter circuit 22 are directly applied to the inputs of the AND gate 13-2 while the remaining counter output signals bit-4, bit-5, bit-6 and bit-7 (MSB) are applied thereto through the inverters 13-3, 13-4, 13-5 and 13-6, respectively. A sampling pulse is generated by the AND gate 13-2 when the count value 23 reaches seven. The A/D converter 11 starts the sampling operation in response to the sampling pulse thus produced.

It should be noted that the generation of the sampling pulse takes place after the timing pulse 16 is generated and the operations of the latch circuit 17, the counter circuit 22 and the flip-flop 24 are stabilized. Insofar as this requirement is met, the sampling pulse may be generated at any time if the converting operations of the A/D converter 11 and the digital value collating circuit 15 are completely terminated during the period between the generation of the sampling pulse 14 and the subsequently generated timing pulse 16.

The above-mentioned example of the timing processing circuit 13 is designed so that the sampling pulse 14 is generated at the time when the count value 23 is seven. The timing pulse 16 outputted by the timing processing circuit 13 is applied to the clear terminal of the counter circuit 22 and to the set terminal of a flip-flop circuit 24.

When the data 18 representative of the pulse number N which is applied to the one port of the comparison circuit 19 coincides with the count value 23 of the counter 22 at the comparison circuit 19, the circuit 19 outputs a coincidence signal 25 to reset the flip-flop circuit 24. A gate signal 26 provided by the flip-flop circuit 24 is applied to one input terminal of an AND circuit 27 to the other input terminal of which the high-frequency pulse 21 generated by the high-frequency pulse generator 20 is applied. The high-frequency pulse 21 is allowed to pass through the AND circuit 27 when the gate signal is at "H", i.e., during the time interval which elapses from the instant that the counter circuit is cleared until the count value 23 of the counter circuit 22 coincides with the data 18 representative of the pulse number N.

The above-described operations will become more apparent from a consideration of FIGS. 6A to 6F. A positive pulse number modulation signal 28 (FIG. 6E) outputted by the AND circuit 27 is applied to one input terminal of a switching circuit 29 and to an inverter circuit 30. In the inverter circuit 30, the positive pulse number modulation signal 28 is inverted to form a negative pulse number modulation signal 31 (FIG. 6F) which is applied to the other input terminal of the switching circuit 29. The eighth bit data signal which is generated by the digital value conversion circuit 15 and latched by the latch circuit 17, namely, a positive-negative switching signal 32, is inputted to the switching circuit 29. One of the positive pulse number modulation signal 28 and the negative pulse number modulation signal 31 are selectively outputted by the switching circuit 29 depending on whether the positive-negative switching signal 32 is at "H" or "L". One of the positive and negative pulse number modulation signals 28 and 31 which has been selected by the switching circuit 29 is applied to a semiconductor laser oscillator driving circuit 33 in response to which the laser oscillator 1 is subjected to binary modulation.

Figure 1:
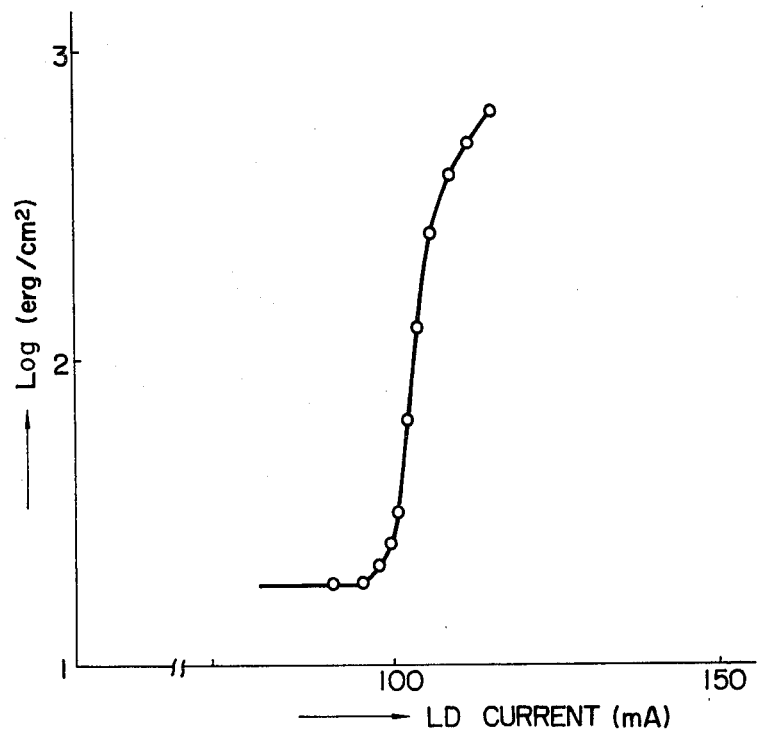
FIG. 1 is a graphical representation of the current vs. optical output characteristic curve of a semiconductor laser.
Figure 2:
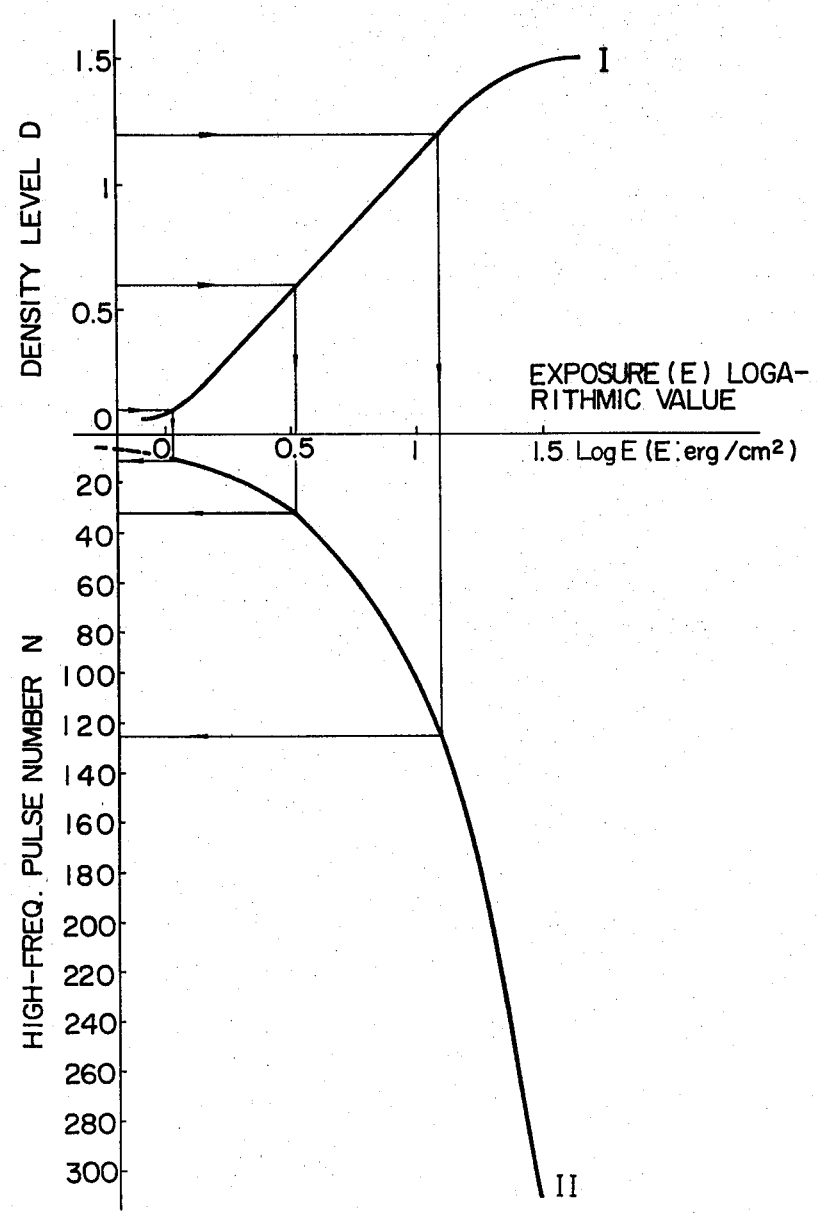
FIGS. 2 and 3A-3C are diagrams for a description of a conventional pulse number modulation and pulse width modulation technique.
Figure 3A:
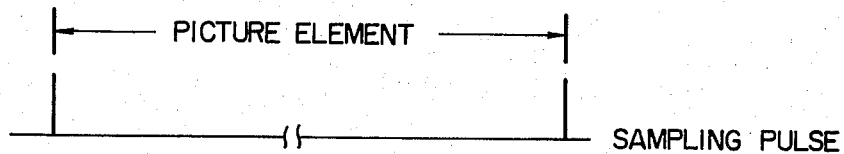
Figure 3B:
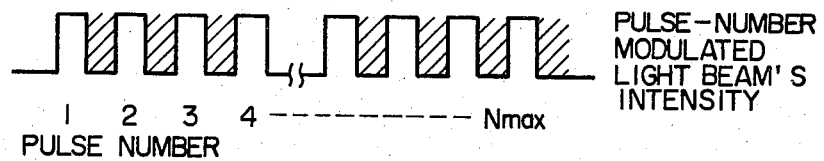
Figure 3C:
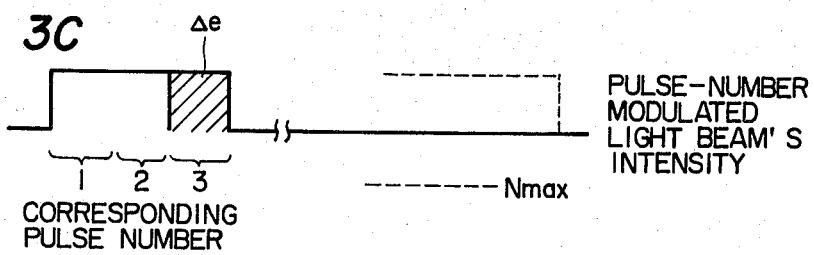
Figure 4A:
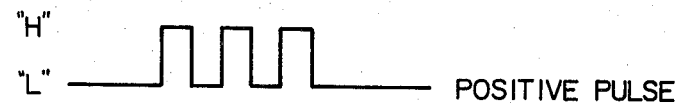
FIGS. 4A and 4B are diagram for a description of positive and negative pulses.
Figure 4B:
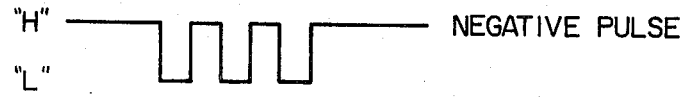

Next, the relation between the input signal level and the positive and negative pulse modulation signals will be described in more detail. When the input signal 9 is at a low level, i.e., when the density is low on the graph of FIG. 2, the positive pulse number modulation signal 28 is employed. On the other hand, when the input signal 9 is at a high level, i.e., when the density is high on the graph of FIG. 2, the negative pulse number modulation signal 31 is employed. This will be described in greater detail with specific numerical values. In the case of FIG. 2, a range of pulse number N required for a range of density of from minimum to 1.4 is from 0 to 254. Therefore, the positive pulse number modulation signal 28 is used for the levels of the input signal 9 which require pulse numbers ranging from the minimum pulse number (zero in this example) to a half (127=254/2 in this example) of the maximum pulse number $N_{max}$ (254 in this example). For this purpose, positive pulse numbers for the various input signal levels are stored in the digital value conversion circuit 11 and the eighth bit data signal which provides the positive-negative switching signal 32 is set to "H". On the other hand, the negative pulse number modulation signal 31 is used for levels of the input signal 9 which require pulse numbers ranging from half (N=127) of the maximum pulse number $N_{max}$ to the maximum pulse number $N_{max}$ ($N_{max}$=254). For this purpose, negative pulse numbers for the various input signal levels are stored in the digital value conversion circuit 11 and the eighth bit data signal providing the positive-negative switching signal 32 is set to "L".

In the above-described example, the relation of the sampling pulse frequency $f_s$, the high-frequency pulse frequency $f'_H$ and the maximum pulse number $N_{max}$ is:

$$f_H \geq (N_{max}/2) \times f_s \qquad (3)$$

As is apparent from expression (3), the high-frequency pulse frequency $f'_H$ may be half of the high-frequency pulse frequency $f_H$ which is determined according to expression (2).

As is apparent from the above description, according to the invention, a modulation ratio, which is a ratio of maximum exposure to exposure per pulse, is substantially twice that of the conventional pulse number modulation technique using only positive pulses. In other words, in the case of providing the same modulation ratio, the high-frequency pulse frequency can be half that used with conventional pulse number modulation as is clear from expression (3). Therefore, the circuit may be formed using less expensive circuit components such as TTL elements. Furthermore, with respect to the quantity of light of the light source, the efficiency of utilization of light is substantially double without decreasing the exposure level resolution for each picture element (the reproduction density resolution) which is advantageous in that the optical output of the light source can be decreased.

What is claimed is:

1. A laser recorder comprising means for sampling an input signal with a sampling pulse; means for providing a predetermined number of pulses during a predetermined sampling period, the number of said pulses being controlled according to a level of the sampled input signal, a positive pulse being provided for a low exposure level and a negative pulse being provided for a high exposure level of said input signal; and means for binary modulating a light beam in accordance with said positive pulses and said negative pulses to record an image having half-tones.

2. The laser recorder of claim 1 wherein said sampling means comprises an analog-to-digital converter.

3. The laser recorder of claim 2 wherein said means for providing a predetermined number of pulses comprises a read-only memory having address input coupled to digital outputs of said analog-to-digital converter, counting means, and means for comparing an output of said counting means with an output of said read-only memory.

4. A laser recorder comprising: a laser oscillator, a laser oscillator driver operatively coupled to said laser oscillator, said laser oscillator driver operating said laser oscillator in accordance with positive or negative pulses applied to said laser oscillator driver; an analog-to-digital converter, an input signal being coupled to an analog input of said analog-to-digital converter; a read-only memory having address inputs coupled to digital outputs of said analog-to-digital converter, said read-only memory having stored therein pulse numbers and a positive-negative pulse identifying bit corresponding to each of said pulse numbers; a latch circuit having inputs coupled to outputs of said read-only memory; a pulse generator for producing a continuous stream of output pulses; a counter having a clock input coupled to an output of said pulse generator; a comparison circuit having a first input port coupled to outputs of said latch and a second input port coupled to count outputs of said counter; a flip-flop having an input coupled to a comparison output of said comparison circuit; an AND gate having a first input coupled to said output of said pulse generator and a second input coupled to an output of said flip-flop; and an inverter having an input coupled to an output of said AND gate; a switch circuit for outputting one of said output of said AND gate and an output of said inverter in response to an input control signal, an output of said latch corresponding to said identifying bit being coupled as control input signal; an output of said switch being coupled to an input of said laser oscillator driver; and a timing processing circuit operating in response to outputs of said counter for producing clock pulse signals for operating said analog-to-digital converter and for producing a signal for resetting said counter and operating said flip-flop and said latch.

5. The laser recorder of claim 4 wherein said timing processing circuit comprises a first decoder operating in response to outputs of said counter for producing a signal for operating said analog-to-digital converter and a second decoder circuit for resetting said counter and operating said flip-flop and said latch.

* * * * *